Aug. 12, 1958
L. LAMB
2,847,024
FLOAT VALVE
Filed May 23, 1957
2 Sheets-Sheet 1
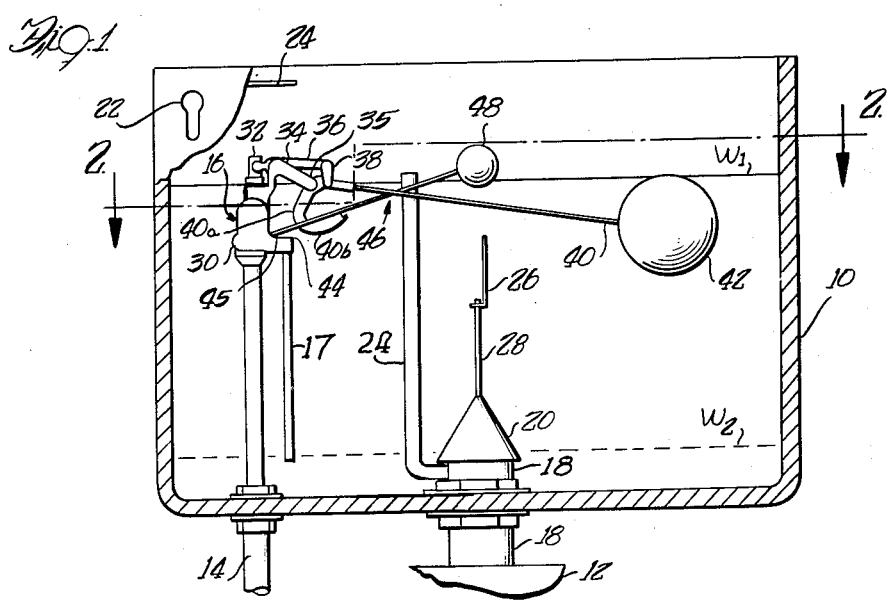
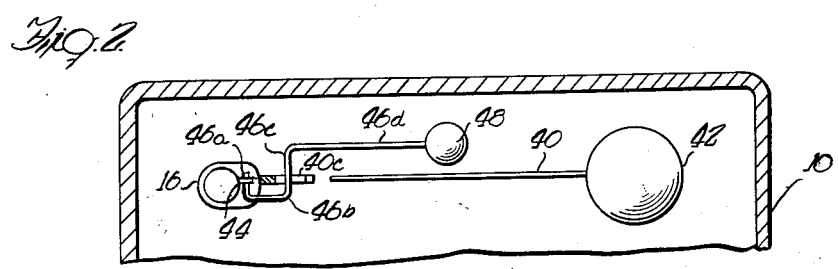
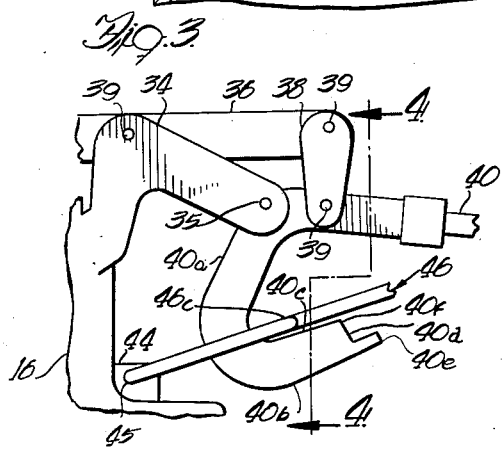
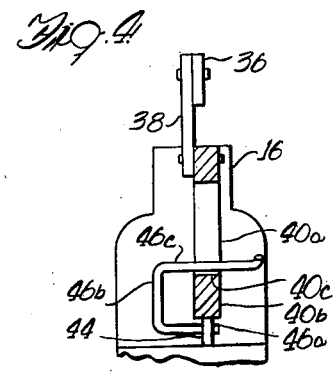
Inventor
Leslie Lamb
BY Frost & Vuksun
Attorney

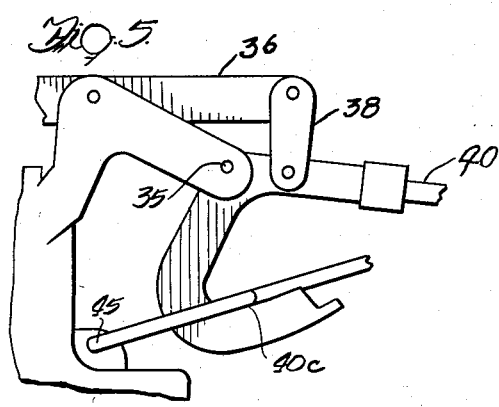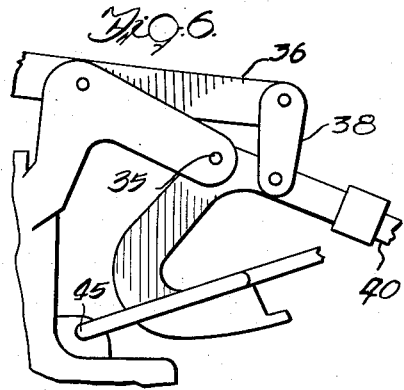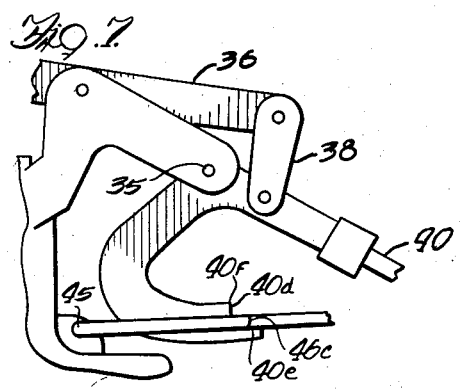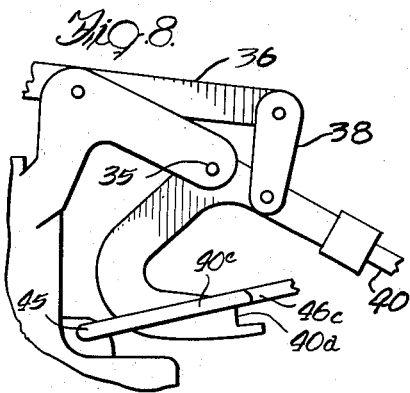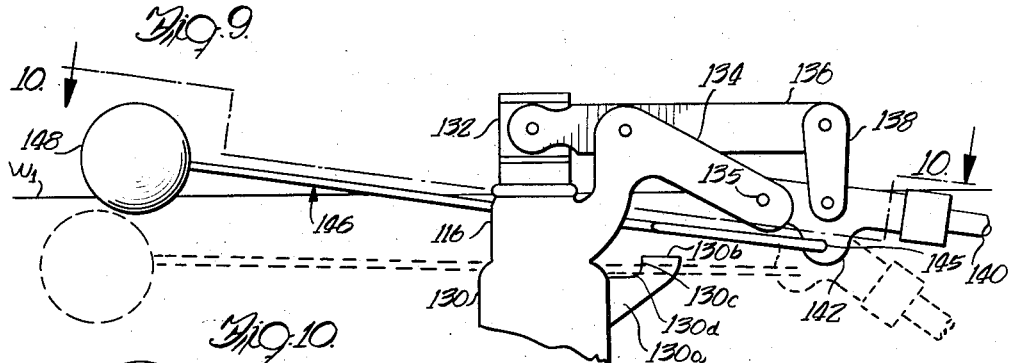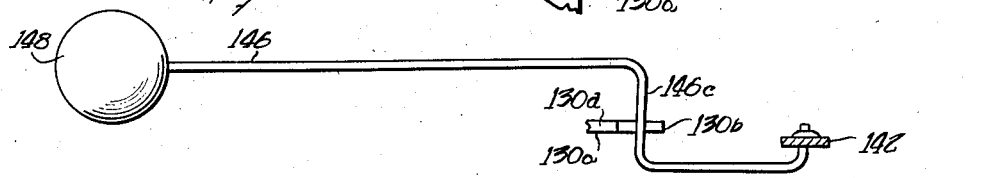

United States Patent Office 2,847,024
Patented Aug. 12, 1958

2,847,024

FLOAT VALVE

Leslie Lamb, Chicago, Ill.

Application May 23, 1957, Serial No. 661,051

3 Claims. (Cl. 137—417)

My invention relates to a ball-cock for controlling water flow to the tank of a water closet, which operates to hold a valve fully open admitting water to the tank until the water has approached a predetermined level at which time the valve is quickly closed.

Less wear is encountered on the valve seat of any hydraulic valve by rapid closure and in the case of residential toilet installations this feature is desirable as it eliminates the extended hissing sounds associated with ball-cocks of the conventional design in which the valve is slowly closed by a float rising with the water level in the tank after the toilet has been flushed.

It is therefore a general object of the present invention to provide a ball cock for a toilet which provides quick and quiet refilling of the tank after flushing.

It is an additional general object to provide a ball cock in which the valve supplying water to the tank is held fully open until the water reaches a predetermined level and then is promptly closed.

It is another object to provide a ball cock having an auxiliary float mechanism which positively locks the main float to hold the valve open until the water has reached a predetermined level and then releases the main float for unobstructed elevation.

It is another object of the present invention to provide in a ball cock, an auxiliary float restraining mechanism which engages the main float only when the valve is in a fully open position, and thereafter becomes disengaged from the main float mechanism to allow free and unrestrained upward travel of the main float to close the valve.

It is a further object of the invention to provide a ball cock with a valve actuating float which maintains closure of the valve while submerged to provide a constant steady force holding the valve in the closed position thereby permitting use of a smaller, easily installed, less costly actuating float.

Another important object is to provide a ball cock which is of simple construction, positive acting and effective in its operation to quickly actuate the valve from its fully open position to its fully closed position to prolong the life of the valve and provide quick and quiet refilling of the tank.

Other ball cocks have been devised in which the main float is delayed from rising until the water has reached a predetermined level both by means of over-the-center spring action or by means of an auxiliary float. However, they have generally been complicated and expensive to produce, and usually require some of the net buoyancy of the main valve actuating float to overcome friction or dead weight of the auxiliary float mechanism. Such ball cocks therefore require a main valve actuating float which is larger in size than would be required if the main float were unhampered by weight or friction of the auxiliary float mechanism.

This objection has been overcome in the present invention in which the applicant has provided a simple, inexpensive, positive action ball-cock which permits quick and quiet refilling of the tank and wherein any friction or dead weight of the auxiliary float mechanism upon the main valve actuating float has been virtually eliminated.

In brief, a main float is carried on an arm swingable about a pivot point. The arm is connected to the valve to open the valve when the float is in a low position and to close the valve when the float is in an elevated position, preferably below a predetermined water level. An auxiliary float is carried on an arm swingable about an auxiliary pivot point. The auxiliary arm has a portion adapted to engage a locking surface. The locking surface and the auxiliary pivot point, one of which is carried on the main arm spaced from the main pivot point, are movable in relation to each other as the main arm swings between its elevated position and its low position. The portion on the auxiliary arm which is adapted to engage a surface is spaced from the auxiliary pivot point to engage the locking surface when the main arm is in the low position. The extent of the locking surface is such that engagement is maintained between the portion of the auxiliary arm and the locking surface, holding the main float and arm in the low position, until the auxiliary float approaches its elevated position in response to the rise of water in the tank. At this time the portion on the auxiliary arm and the locking surface become disengaged, releasing the main arm and float from their low position, for unobstructed elevation to close the valve. This construction permits the extent of elevation of the main float to be predetermined with the main float, in the elevated position, preferably lying below the predetermined water level. The main float thereby exerts a more constant force on the valve and utilizes its entire net buoyancy to close and maintain closure of the valve instead of only the small portion of its net buoyancy which would be utilized if the main float rode on the surface of the water. This permits a much smaller and less costly main float to be used than in conventional ball cock installations.

Preferably the locking surface should be arcuate and be defined by the arc of a circle having a center at substantially the auxiliary pivot point when the main arm and float are locked in the low position. With this construction the position on the auxiliary arm and the locking surface can slide in relation to each other while the auxiliary float is ascending and the main arm and float is locked in the low position.

It is an important feature of applicant's invention that the auxiliary float, and arm, as they approach the elevated position, are spaced from the main float and arm as they ascend to their elevated position. With applicant's construction, the main float, and arm, can swing rapidly and without obstruction to the elevated position after release. This quickly and positively shuts off the valve when the water in the tank reaches its predetermined level.

The novel features which I believe to be characteristic of my invention are set forth with particularity in the appended claims. My invention itself, however, both as to its organization and method of operation, together with further objects and advantages thereof, will be best understood by reference to the following description taken in conjunction with the accompanying drawings in which:

Figure 1 is an elevational view, with parts broken away for clarity, of a toilet water container;

Figure 2 is a view through section 2—2 of Figure 1;

Figure 3 is an enlarged elevational view of a portion of the valve housing showing the pivoted connection of the main float arm and the auxiliary float arm thereto and the position of the respective arms when the water in the container is at its high predetermined level;

Figure 4 is a view through section 4—4 of Figure 3;

Figure 5 is a view similar to Figure 3 except that the respective arms are shown in the position they assume when the water has begun to drop in the water container after opening of the water outlet;

Figure 6 is a view similar to Figure 5 except that the respective arms are shown in the position they assume when the level of the water in the container continues to drop from the level defining the position of the arms in Figure 5;

Figure 7 is a view similar to Figure 6 except that the respective arms are shown in the position they assume when the main float is in its low position and the water in the container is at its low level;

Figure 8 is a view similar to Figure 7 except that the respective arms are shown in the position they assume as the water in the container rises, after the water outlet is closed and water from the source admitted, and approaches its predetermined high level;

Figure 9 is a fragmentary elevational view, showing another embodiment of the present invention; and Figure 10 is a view through section 10—10 of Figure 9.

There is shown in Figure 1 a water container 10 connected to a toilet bowl 12. The water container receives water from a source (not shown) through pipe 14, valve 16, and pipe 17. The water is discharged from the container 10 to the bowl 12 through a water outlet defined by pipe 18. The discharge of the water is controlled by the valve 20 which is operable to cover and uncover the opening in pipe 18 within the container 10. The valve 20, in turn, is operated by handle 22 located outside of the container 10 which actuates rods 26 and 28 to selectively open and close the outlet to the bowl. An overflow pipe 24 is located in the container and the upper portion of that pipe extends slightly above a predetermined water level $W_1$. The overflow pipe 24 is connected, at its lower end, to the outlet pipe 18.

The valve 16 controls the flow of water from the source to the interior of the container. The valve is a conventional ball-cock type and has a housing 30 and a valve stem 32 extending from the top of the housing. The valve stem 32 is movable in the vertical direction and operates to shut off water when depressed and to admit the water when in its extended position. The valve housing 30 has an arm 34 which extends outwardly at a downward angle from the upper portion of the housing.

A link 36 is pivotally connected at one end to the valve stem 32 and pivotally connected at the opposite end to another link 38. The link 36 is pivotally connected between its two ends to the upper portion of the downwardly extending arm 34. The lower portion of the downwardly extending arm 34 is pivotally connected to a main arm 40 to define a main pivot point 35 for that arm. The arm 40 carries, at its outer end, a main float 42. The end of the link 38 opposite the end connected to the link 36 is pivotally connected to the arm 40 between the float 42 and the main pivot point. With this construction the main float 42 swings about the main pivot point in a vertical plane and pivots, through link 38, the link 36 about its connection to the arm 34 to actuate the valve stem 32. The pivotal connections above described may be made with a pivot pin 39 extending through the parts joined and peened at each end, or made, as in general practice, by the use of small threaded studs provided with cast wings for convenient disassembly when required.

An ear 44 extends from the lower portion of the housing 30 and has an opening adapted to pivotally receive an auxiliary arm 46 to define an auxiliary pivot point 45. The arm 46, after insertion into the opening in ear 44, is retained preferably by use of a small "push-nut" type fastener. This latter arm carries, at its end opposite the ear 44, an auxiliary float 48 which is swingable in a vertical plane spaced from the plane of the main float 42. The auxiliary arm 46 has portions 46a, 46b, 46c, and 46d. As shown in Figure 2, portion 46a extends in a direction normal to the plane of the main float 42 and is received within the opening in the ear 44. The portion 46b extends parallel to the arm 40. The portion 46c extends in a direction normal to the plane in which the main float 42 swings and intersects that plane to define a portion adapted to be engaged by the arm 40. The portion 46d extends parallel to the arm 40 on the opposite side of that arm from portion 46b and connects at its outer end to the auxiliary float 48.

The arm 40 has, adjacent the main pivot point, a hook-like conformation consisting of a portion 40a extending in a generally downward direction from the main pivot point and a bent-back portion 40b lying substantially in the plane of the main float 42 and the arm 40. The bent-back portion 40b has an upper surface 40c defining a bed, as shown in Figure 3. At the outer end of the portion 40b is a downwardly extending locking surface 40d which has extending from the lower portion thereof an arresting surface 40e. The locking surface 40d and bed 40c meet at an angle to define a junction 40f. The bed should slope downwardly from the junction or be oriented so that no portion of the bed is closer to the main pivot point 35 than the junction 40f.

The main float 42 swings about the main pivot point in a vertical plane between an elevated position and a low position. Preferably the elevated position of the float 42 is below the predetermined water level $W_1$ in the container. The main float 42 may, for example, be restrained from moving above this elevated position by the links 38 and 36 by which it is connected to the valve stem 32. The link 38 may be made of a length to hold the main float 42 in an elevated position below the predetermined level of the water $W_1$ when the valve stem 32 is fully depressed. The low position of the float 42 may be defined by the water level $W_2$ to which the water drops on the raising of valve 20. Alternately, the low position of the main float 42 may be defined by stops (not shown) or by the fully extended position of valve stem 32 serving to check the downward movement of the main float 42 through the links 36 and 38. The auxiliary float 48 swings through a second vertical plane parallel to and spaced from the plane of the main float 42. The elevated position of the auxiliary float 48 is defined by the water level $W_1$. The low position of the auxiliary float 48 is defined by the arresting surface 40e on arm 40 as described hereafter.

Prior to discharge of the water through the outlet pipe 18 the water in the container 10 is at the predetermined level $W_1$ with the valve 20 covering the water outlet 18. The valve 16 is closed and the main float 42 lies in its elevated position below the level $W_1$ of the water. The auxiliary float 48 lies on the surface of the water. At this time, as shown in Figure 3, the portion 46c of the auxiliary arm 46 carrying the auxiliary float lies above the bed 40c of the main arm. When the valve 20 is raised and the water in the container begins to drop the auxiliary arm 46 swings downwardly until the portion 46c engages the bed 40c of the main arm as shown in Figure 5. As the water continues to drop and the main float begins to descend the portion 46c rides outwardly on the bed 40c as shown in Figure 6. The main float 42 continues to drop in response to the dropping water level until the water level has reached $W_2$ (see Figure 1) and the main float is in its low position. At this point the portion 46c rides over the junction 40f and drops on to the arresting surface 40e in engagement with the locking surface 40d as shown in Figure 7. In this position the auxiliary float 48 is in its low position. The engagement of the portion 46c and the locking surface 40d hold the main arm and float in the low position with the valve 16 fully open. After release of the handle 22 the valve 20 drops into position over the water outlet pipe 18 and the water begins to rise in the container. The auxiliary float 48 floats upwardly with the rising water and swings the arm 46 upwardly. The portion 46c rides upwardly on the locking surface 40d maintaining engagement with that surface as shown in Figure 8. It will be noted that because of the arcuate conformation of the locking surface, and the location of the auxiliary pivot point in relation to the locking surface when the arm is in the down position, that the portion 46c will ride on the surface 40d while maintaining the arm 40 in the low position. Thus the valve is held in the fully open position by links 38 and 36 during substantially the entire upward travel of the auxiliary arm 46. As the arm 46 and the float 48 approach their elevated position, the portion 46c rides over the junction 40f and out of engagement with the locking surface 40d. At this moment the arm 40 quickly swings from its low position, where it has been held by the auxiliary arm, to the elevated position where the valve is fully closed. It should be noted that since no portion of the bed 40c lies closer to the main pivot point than the junction 40f, the upwardly swinging main arm 40 will not contact, or be obstructed by, any portion of the auxiliary float mechanism. This quick, upward unrestrained travel permits quick and full closure of the valve. It will also be noted from Figure 2 that the vertical planes of travel of the floats and the arms are spaced from each other so that no possible interference can exist as the main arm is released for upward movement. The fact that the main float 42 closes the valve when it reaches a position below the predetermined level of the water increases the speed with which the valve is closed, since the maximum upward buoyant force is maintained through the entire travel of the main float.

Another form of the present invention is shown in Figures 9 and 10. In this embodiment the valve 116 has a housing 130 and a valve stem 132 which operates in the vertical direction similar to the valve 16. The housing 130 has an upwardly extending arm 130a which has, at its upper end, a bed 130b. At the end of the bed toward the housing is a downwardly extending locking surface 130c. The surface of the arm connecting the bed and locking surfaces to the housing defines an arresting surface 130d extending from the bottom of the locking surface 130c. The housing also has a downwardly extending arm 134 similar to the arm 34 of valve 16. A main float arm 140 is pivotally connected to the lower portion of arm 134 to define a main pivot point 135. Links 136 and 138 pivotally connect the main float arm 140 to the valve stem to close the valve when the float carried by the main float arm 140 is in the elevated position and to open the valve when the float is in the low position in the same manner as the construction linking the valve 16 to the main float arm 40. The arm 140 has a depending ear 142 to which is pivotally connected an auxiliary arm 146 defining an auxiliary pivot point 145. The arm 146 carries an auxiliary float 148 at its outer end. The auxiliary arm has a portion 146c lying in a direction normal to the fixed arm 130a and adapted to engage that arm as the auxiliary arm swings downwardly. The pivotal connections in this embodiment may be similar to those employed in the embodiment of Figure 1.

Prior to the discharge of the water from the container the water is at a predetermined level $W_1$ and the auxiliary float 148 rides on the surface thereof. The main float (not shown) is in its elevated position which may be below the surface of the water and is sustained in that postion by the linkage connecting it to the closed valve 116.

When the water is discharged from the container the auxiliary float 148 drops and the portion 146c engages the bed 130b. As the water continues to drop the main float descends and the arm 140 pivots about the main pivot point. This causes the portion 146c to ride along the bed 130b towards the valve until the main float is in its low position. At this time the portion 146c drops to the arresting surface 130d and engages the locking surface 130c. This sustains the main float and arm in the low position, holding the valve 116 in the fully open position. After the outlet pipe has been closed and the water in the container begins to rise the auxiliary float 148 rises with the rising water level in the container, sliding the portion 146c up the locking surface 130c. After the arm 146 has risen to the point where the conformation 146c disengages from the locking surface 130c the main arm and float are free to quickly rise to their elevated position, quickly and completely closing the valve.

While I have shown and described specific embodiments of the present invention, it will of course, be understood that various modifications and alternative constructions may be made without departing from the true spirit and scope of the invention. I therefore intend by the appended claims to cover all such modifications and alternative constructions as fall within their true spirit and scope.

What I claim as new and desire to secure by Letters Patent is:

1. A valve control mechanism for a flush tank having a liquid inlet, comprising in combination: a main float; a main arm affixed to the main float; means supporting the main arm for swinging movement about a predetermined axis as the main float rises and falls and permitting such movement from an elevated position where the main float is near the liquid surface with the tank full and a lowered position spaced from the elevated position by substantially the extent of the drop in water level in flushing operation; valve mechanism operably associated with the main arm to close the liquid inlet progressively as the main float rises from the lowered position and to shut off the liquid inlet as the main float reaches said elevated position; an auxiliary float; an auxiliary arm affixed to the auxiliary float; means supporting the auxiliary arm, said means including a first element on the main arm spaced from said axis and a second element of fixed position, whereby the elements shift in relation to each other as the main arm rises and falls, one of said elements supporting the auxiliary arm for swinging movement about an axis spaced from said first axis and the other of said elements being in the form of a substantially horizontal cam surface spaced from both of said axes in all operating positions and having a substantially vertical shoulder, the auxiliary arm having conformations resting on said cam surface to support the auxiliary arm until the main float descends to said lowered position at which time the auxiliary arm drops over said shoulder and locks the main arm against rising movement until the tank is nearly full.

2. A valve control mechanism for a flush tank having a liquid inlet, comprising in combination: a main float; a main arm affixed to the main float; means supporting the main arm for swinging movement about a first predetermined axis as the main float rises and falls and permitting such movement from an elevated position where the main float is near the liquid surface with the tank full and a lowered position spaced from the elevated position by substantially the extent of the drop in water level on flushing operation; valve mechanism operably associated with the main arm to close the liquid inlet as the main float reaches said elevated position, the main arm having a hook portion extending beneath said first predetermined axis and defining a substantially horizontal cam surface and having a substantially vertical shoulder; an auxiliary float; an auxiliary arm affixed to the auxiliary float; means pivotally supporting the auxiliary arm for swinging movement about a predetermined axis as the water level rises and falls, the auxiliary arm having a portion extending crosswise of the cam surface and resting thereon as the auxiliary arms descends whereby said portion of the auxiliary arm rests on the cam surface to support the auxiliary arm during flushing operations and rides over said shoulder to lock the main arm in down position until the auxiliary arm is lifted by flotation, said cam surface being spaced from both of said axes in all operating positions.

3. A valve control mechanism for a flush tank having a liquid inlet, comprising in combination: a main float; a main arm affixed to the main float; means supporting the main arm for swinging movement about a first predetermined axis as the main float rises and falls and permitting such movement from an elevated position where the main float is near the liquid surface with the tank full and a lowered position spaced from the elevated position by substantially the extent of the drop in water level on flushing operation; valve mechanism operably associated with the main arm to close the liquid inlet as the main float reaches said elevated position; an auxiliary float; an auxiliary arm affixed to the auxiliary float; means pivotally supporting the auxiliary arm from the main arm for swinging movement about a second predetermined axis on the main arm as the water level rises and falls; means defining a fixed substantially horizontal cam surface having a substantially vertical shoulder, said cam surface being spaced from both of said axes in all operating positions, the auxiliary arm having a portion extending crosswise of the cam surface and resting thereon as the auxiliary arm descends, whereby said portion of the auxiliary arm rests on the cam surface during flushing operations to support the auxiliary arm and rides over said shoulder to lock the main arm in down position until the auxiliary arm is lifted by flotation.

References Cited in the file of this patent
UNITED STATES PATENTS

| | | |
|---|---|---|
| 1,044,403 | Luce et al. | Nov. 12, 1912 |
| 1,564,533 | Cunningham | Dec. 8, 1925 |
| 2,764,179 | Yonchar | Sept. 25, 1956 |